United States Patent
Cairns et al.

[11] 3,857,856
[45] Dec. 31, 1974

[54] 4-OXO-4H-1-BENZOPYRAN AND 4-OXO-4H-1-THIABENZOPYRAN COMPOUNDS

[75] Inventors: Hugh Cairns; Norman Harold Rogers, both of Loughborough, England

[73] Assignee: Fisons Limited, London, England

[22] Filed: Sept. 26, 1972

[21] Appl. No.: 292,453

Related U.S. Application Data
[63] Continuation-in-part of Ser. No. 260,205, June 6, 1972, abandoned.

[30] Foreign Application Priority Data
Sept. 30, 1971  Great Britain.................... 45470/71
Oct. 18, 1971  Great Britain.................... 53568/71
Dec. 28, 1971  Great Britain.................... 60208/71
Dec. 28, 1971  Great Britain.................... 60209/71

[52] U.S. Cl. ....... 260/327 TH, 260/345.2, 424/275, 424/283
[58] Field of Search .................. 260/327 TH, 345.2

[56] References Cited
UNITED STATES PATENTS
3,629,290  12/1971  Cairns et al. .................... 260/345.2
3,710,459  1/1973  Hazard et al. .................. 260/327 TH
3,720,690  3/1973  King et al. .......................  260/345.2

*Primary Examiner*—Henry R. Jiles
*Assistant Examiner*—C. M. S. Jaisle
*Attorney, Agent, or Firm*—Wenderoth, Lind & Ponack

[57] ABSTRACT

There are described 4-oxo-4H-1-benzopyran and 4-oxo-4H-1-thiabenzopyran compounds having a group -CONROH in the 2-position, R representing hydrogen, alkyl, phenyl or phenylalkyl, provided that the compounds are not of formula XXXI,

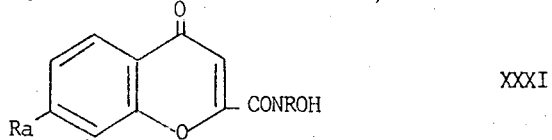

in which Ra is hydrogen or chloride, and pharmaceutically acceptable derivatives thereof. The compounds are indicated for use in the treatment of asthma.

8 Claims, No Drawings

4-OXO-4H-1-BENZOPYRAN AND 4-OXO-4H-1-THIABENZOPYRAN COMPOUNDS

This application is a continuation-in-part of Ser. No. 260,205, filed June 6, 1972, now abandoned.

This invention relates to new 4-oxo-4H-1-benzopyran and 4-oxo-4H-1-thiabenzopyran derivatives, compositions containing them and methods for their preparation.

According to our invention we provide compounds to be called compounds I, i.e. 4-oxo-4H-1-benzopyran and 4-oxo-4H-1-thiabenzopyran compounds having a group —CONROH in the 2-position, R representing hydrogen, alkyl, phenyl or phenylalkyl provided that the compounds are not of formula XXXI,

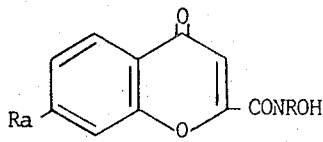

in which Ra is hydrogen or chlorine,
and pharmaceutically acceptable derivatives thereof.

According to a preferred feature of our invention we provide compounds of formula Ia,

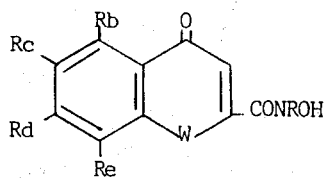

in which (i) Rb, Rc, Rd and Re which may be the same or different, each represent hydrogen, alkyl, halogen, hydroxy, alkenyl, phenyl, alkoxy, alkenyloxy or phenylalkoxy; the alkyl, alkenyl, phenyl, alkoxy, alkenyloxy and phenylalkoxy groups optionally being substituted by a hydrogen, alkoxy, or halo group or by a 5 or 6 membered heterocyclic ring containing carbon and oxygen, or (ii) one or two adjacent pairs of Rb, Rc, Rd and Re represent a chain —COOH=C(CONROH)—W—, or a group of formula II,

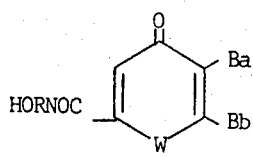

in which Ba and Bb represent the pair of groups: a carbon-carbon bond and —CRf=CRg—,
or an adjacent pair of Rb, Rc, Rd and Re represent a group of formula III,

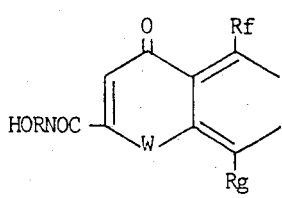

Rf and Rg having the same significances as Rb, Rc, Rd and Re given in (i) above,
or one of Rb, Rc, Rd and Re represent a group of formula IV,

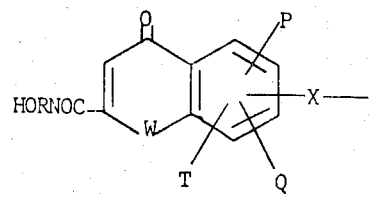

in which X is a carbon-carbon bond, a single linking atom or a 5 or 6 membered carbocyclic or a 5 or 6 membered heterocyclic ring or a hydrocarbon chain which chain may be substituted by a hydroxy group, a halogen atom or a C 1 to 6 alkoxy group or interrupted by a 5 or 6 membered carbocyclic or 5 or 6 membered heterocyclic ring, an oxygen atom, a sulphur atom, a nitrogen atom, an SO or SO₂ group, or X is a group —O—X'—O— in which X' is a straight or branched hydrocarbon chain which may be interrupted by a 5 or 6 membered carbocyclic or a 5 or 6 membered oxygen containing heterocyclic ring, an oxygen atom, a nitrogen atom or a carbonyl group, and which may be substituted by a hydroxy group, an alkoxy group or a halogen atom, P, Q and T have the same significances as Rb, Rc, Rd and Re given in (i) above,
W is oxygen or sulphur, and
R is hydrogen, alkyl, phenyl or phenylalkyl,
provided that when W is oxygen and R, R6, Rc and Re are all hydrogen Rd is not hydrogen or chlorine,
and pharmaceutically acceptable derivatives thereof.

According to our invention we also provide a process for the production of a compound I, or a pharmaceutically acceptable derivative thereof, which comprises a. reacting an ester, anhydride or acid halide of a (to be called a compound XVIII) corresponding to 4-oxo-4H-1-benzopyran or of a corresponding 4-oxo-4H-1-thiabenzopyran having a —COOH group in the 2- position,
with a compound of formula V,

NHROH     V in which R is as defined above, b. selective dehydrogenation of a (to be called a compound XIX) corresponding 2,3-dihydro-4-oxo-4H-1-benzopyran or of a corresponding 2,3-dihydro-4-oxo-4H-1-thiabenzopyran having a group -CONROH in the 2- position, in which R is as defined above, or c. selective hydrogenation or hydrolysis of a (to be called a compound XXII) corresponding 4-oxo-4H-1-benzopyran or of a corresponding 4-oxo-4H-1-thiabenzopyran having a group -CONROY in the 2- position in which R is as defined above, and Y represents a group which is convertible to a hydrogen atom by hydrogenation or hydrolysis,
and where desired converting the compound I to a pharmaceutically acceptable derivative thereof.

More specifically we provide a process for the production of a compound of formula Ia, or a pharmaceutically acceptable derivative thereof, which comprises, a. reacting an ester, anhydride or acid halide of a compound of formula VI,

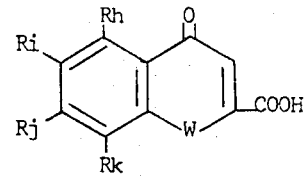

in which W is as defined above,

Rh, Ri, Rj and Rk have the same significances as Rb, Rc, Rd and Re in (i) above, or one or more adjacent pairs of Rh, Ri, Rj and Rk represent a chain —COCH=C(COOH)—W— or a group of formula VII,

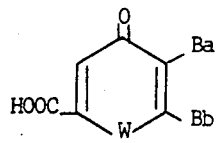
VII in which W, Ba and Bb are as defined above,
or an adjacent pair of Rh, Ri, Rj and Rk represent a group of formula VIII,

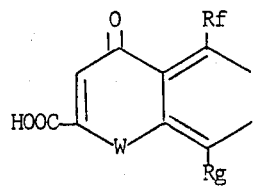
VIII in which W is as defined above, and
Rf and Rg are as defined above,
or one of Rh, Ri, Rj and Rk represent a group of formula IX,

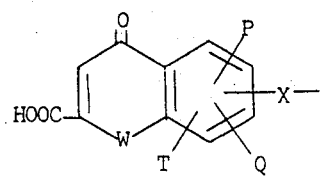
IX in which W, X, P, Q and T are as defined above, and W and the proviso are as defined above,
with a compound of formula V, b. selectively dehydrogenating a compound of formula X,

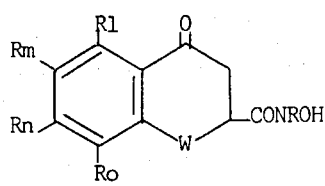
X in which W and R are as defined above,
Rl, Rm, Rn and Ro have the same significances as Rb, Rc, Rd, and Re as defined in (i) above,
or one or more adjacent pairs of Rl, Rm, Rn and Ro represent a chain —COCH$_2$CH(CONROH)—W— or a group of formula XI,

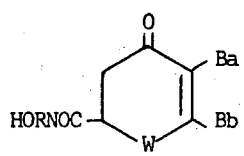
XI in which R, W, Ba and Bb are as defined above,
or an adjacent pair of Rl, Rm, Rn and Ro represent a group of formula XII,

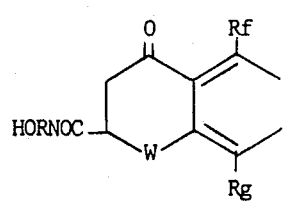
XII in which W, R, Rf and Rg are as defined above,
or one of the Rl, Rm, Rn and Ro represent a group of formula XIII,

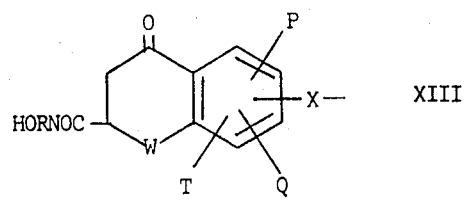
XIII in which P, Q, T, W, R and the proviso are as defined above, or c. selectively hydrogenating or hydrolysing a compound of formula XIV,

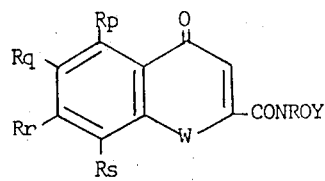
XIV in which W, Y and R are as defined above,
Rp, Rq, Rr and Rs have the same significances as Rb, Rc, Rd and Re in (i) above,
or one or more adjacent pairs of Rp, Rq, Rr and Rs represent a chain —COCH=C(CONROY)—W—, or a group of formula XV,

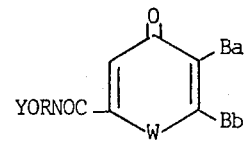
XV in which W, R, Ba and Bb are as defined above,
or an adjacent pair of Rp, Rq, Rr and Rs represent a group of formula XVI,

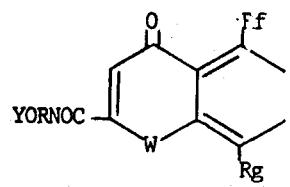
XVI in which W, R, Rf and Rg are as defined above,
or one of Rp, Rq, Rr and Rs represents a group of formula XVII,

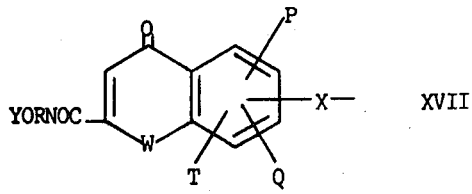
XVII in which P, Q, T, W, Y and R are as defined above, and the proviso is as defined above, and where desired converting the compound of formula Ia to a pharmaceutically acceptable derivative thereof.

In process (a) the anhydride is preferably a mixed anhydride of such a type that it will cleave preferentially, to give the desired benzopyran or thiabenzopyran carbohydroxamic acid, as the major product when reacted with a compound of formula V. Examples of suitable acids from which the mixed anhydride may be derived are sulphonic acids e.g. benzene sulphonic acid, sterically hindered carboxylic acids, e.g. pivalic, isovaleric, diethylacetic or triphenylacetic acid, and alkoxy formic acids, e.g. ethoxy or isobutoxy formic acid. The reaction is preferably carried out under anhydrous conditions in a solvent which will not react with either the compound of formula V or the mixed anhydride, e.g. pyridine or dimethylformamide. However when the reaction is carried out in a non-basic solvent, e.g. dimethylformamide, an adequate proportion of an acid acceptor, e.g. triethylamine, should also preferably be present. The reaction is preferably carried out at a temperature of from about $-15°$ to $+20°C$. When an acid halide is used it may conveniently be an acid chloride. Suitable esters include those derived from alkanols containing from 1 to 10 and preferably from 1 to 6 carbon atoms. When an ester is used the reaction may conveniently be carried out in a solvent which is inert under the reaction conditions, e.g. dimethylformamide, in the presence of a base, e.g. sodium hydroxide, and at room temperature, i.e. at about 20°C.

In process (b) the dehydrogenation may be carried out using for example selenium dioxide, palladium black, chloranil, dichlorodicyanoquinone or sulphur. Alternatively the dehydrogenation may be carried out indirectly by halogenation followed by dehydrohalogenation, e.g. by treatment with N-bromosuccinimide or pyridinum bromide perbromide to yield the 3-bromo derivative which is subsequently dehydrobrominated.

In process (c) the group Y may be a benzyl group which may be removed by hydrogenation, e.g. using a conventional catalyst. Alternatively the group Y may be an acyl (e.g. lower acyl such as a C 1 to 6 alkanoyl) group which may be removed by hydrolysis.

The compounds I may be recovered from the reaction mixture using conventional techniques.

The esters, acid halides and anhydrides of the compounds XVIII, and the compounds of formula V themselves, are either known or may be made by methods known for the manufacture of similar known compounds. Thus the anhydrides of compounds XVIII may be made by conventional techniques, e.g. by reaction of an acid halide of one of the acids with the other acid, e.g. the reaction of a sulphonyl chloride or an alkyl chloroformate with the acid compound XVIII. The reaction may be carried out under the conditions described above for process (a).

Compounds XIX may be made by selective hydrogenation of a corresponding compound I, or of a suitably protected derivative thereof. 2,3-Dihydro-4-oxo-4H-1-benzopyran-2-carbohydroxamic acids may also be made by cyclisation of a corresponding compound (to be called a compound XX) in which a pair of groups —COCH=CH—CONROM and —OM, in which M is hydrogen or an alkali-metal and R is as defined above, are attached to ortho positions on a benzene nucleus, for example by treatment of the compound XX with a base or acid in a solvent which is inert under the reaction conditions.

The compounds XXX may be made by reacting a compound (to be called a compound XXI) in which a pair of groups —COCH=CH—COORy (Ry being an ester forming, e.g. a C 1 to 6 alkyl, group) and —OH, are attached to ortho positions on a benzene nucleus, with a compound of formula V.

The compounds XXII may be made by conventional techniques from known starting materials and compound I. Compounds XXI may be made by reacting an appropriate phenolic compound with maleic anhydride.

Some of the groups P, Q, R and Rb and Rs may be affected by the reaction conditions described above. Where necessary or desirable therefore the reaction may be carried out using protected derivatives of the reagents.

It will be appreciated that the group —CONHOH, which is a preferred form of the group —CONROH, represented above may also exist in the tautomeric form —C(OH)=N—OH and this tautomeric form of the compounds I is also included in our invention.

The process described above may produce the compound I or a derivative thereof. It is also within the scope of this invention to treat any derivative so produced to liberate the free compound I, or to convert one derivative into another. Suitable derivatives include salts and notably water-soluble salts. Salts which may be mentioned include basic addition salts, e.g. ammonium salts, ammonium salts, e.g. derived from mono-, di- and tri-lower alkyl amines, alkali-metal and alkaline-earth metal salts, notably the sodium salt.

According to a further feature of our invention we provide a process for the production of a pharmaceutically acceptable salt of a compound I which comprises treating a compound I, or another salt thereof, with an appropriate base of salt containing an available pharmaceutically acceptable cation.

The compounds I, and pharmaceutically acceptable derivatives thereof, are useful because they possess pharmacological activity in animals; in particular they are useful because they inhibit the release and/or action of pharmacological mediators which result from the in vivo combination of certain types of antibody and specific antigen, e.g. the combination of reaginic antibody with specific antigen. (See Example A below).

In man, both subjective and objective changes which result from the inhalation of specific antigen by sensitised subjects are inhibited by prior administration of the new compounds. Thus the new compounds are useful in the treatment of asthma, e.g. allergic asthma. The new compounds are also useful in the treatment of so-called 'intrinsic' asthma (in which no sensitivity to extrinsic antigen can be demonstrated). The new compounds are also of use in the treatment of other conditions in which antigen-antibody reactions are responsible for disease, for example, allergic rhinitis and urticaria.

For the above mentioned uses the dosage administered will, of course, vary with the compound employed, the mode of administration and the treatment desired. However, in general, satisfactory results are obtained when the compounds are administered at a dosage of from 0.1 to 50 mg per kg of animal body weight in the test set out in Example A. For man the total daily dosage is in the range of from about 1 mg to 3,500 mg preferably 5 to 1,500 mg and more preferably 10 to 1,000 mg which may be administered in divided doses from 1 to 6 times a day or in sustained release form. Thus unit dosage forms suitable for administration (by inhalation or oesophageally) comprise from about 0.17 mg to 600 mg of the compound admixed with a solid or liquid pharmaceutically acceptable diluent or carrier.

The compounds I, and pharmaceutically acceptable derivatives thereof, may be administered by conventional techniques, preferably in admixture with a major proportion of a pharmaceutically acceptable adjuvant, diluent or carrier. Specifically the compounds may be administered by inhalation as a liquid or powder composition, e.g. a powder composition containing a compound I having a particle size of from 0.1 to 10 microns and a diluent such as lactose, or oesophageally as a tablet or capsule.

As a preferred group of compounds we provide those of formula Ic,

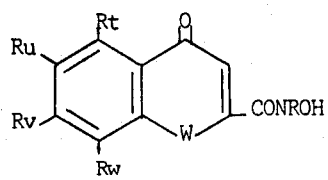

in which R, W and the proviso are as defined above,
Rt, Ru, Rv and Rw have the same significances as Rb, Rc, Rd and Re in (i) above, and/or
an adjacent pair of Rt, Ru, Rv and Rw represent a chain —COCH=C(CONROH)—W—, or one of Rt, Ru, Rv and Rw represent a group of formula XXX,

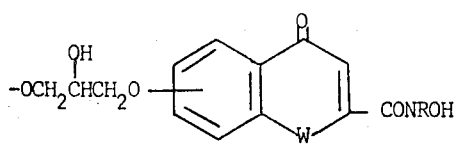

in which W and R are as defined above.

Rb, Rc, Rd and Re preferably each contain up to 10 and more preferably up to 6 carbon atoms. Rb, Rc, Rd and Re may be, for example, hydrogen, alkyl C 1 to 10, chlorine, bromine, fluorine, hydroxy, alkenyl C2 to 10, phenyl, alkoxy C 1 to 10, alkenyloxy C2 to 10, or phenyl-alkoxy, the alkoxy of which is C 1 to 4; hydroxy-alkyl C 1 to 10, hydroxy-alkoxy C 1 to 10, alkoxy-alkyl in which the alkoxy and alkyl groups are both C 1 to 10, or alkoxy-alkoxy in which both alkoxy groups are C 1 to 10. When one of Rb, Rc, Rd and Re represents a group substituted by a heterocyclic ring the ring may be, for example, a tetrahydrofuran ring.

As a preferred group we provide those compounds in which Rb, Rc, Rd and Re are selected from hydrogen; alkyl, e.g. propyl; alkoxy, e.g. methoxy or pentyloxy; alkenyl, e.g. allyl; and hydroxy.

W is preferably oxygen.

R is preferably alkyl C 1 to 6, e.g. methyl; phenyl, or more preferably hydrogen.

Preferred values of X are a carbon-carbon bond, —CH$_2$—, —CHOH—, —C(R$^4$)$_2$—, —CO—, —CH(COOH)— and esters thereof, —C(=CCl$_2$)—, —CHC$_5$H$_4$N—, —NH—, —S—, —SO—, —SO$_2$— and —O—, R$^4$ being an alkyl C 1 to 6 group, a saturated or unsaturated, straight or branched C 2 to 10 polymethylene chain which may carry one or more OH or C 1 to 6 alkoxy groups, halogen atoms or carbonyl oxygen substituents and which may have the chain thereof interrupted by one or more oxygen or nitrogen atoms.

Preferred values of X' are a saturated or unsaturated, straight or branched C 2 to 10 polymethylene chain which may carry one or more hydroxy groups, C 1 to 6 alkoxy groups, halogen atoms or carbonyl oxygen substituents and which may have the chain thereof interrupted by one or more oxygen or nitrogen atoms.

The invention is illustrated, but in no way limited by the following Examples.

EXAMPLE 1 a.

6,8-Di-t-Butyl-4-oxo-4H-1-benzopyran-2-carbohydroxamic acid 6,8-Di-t-Butyl-4-oxo-4H-1-benzopyran-2-carboxylic acid (18.12g) was dissolved in anhydrous pyridine (300 ml) and the stirred solution was then cooled to −10°C. Benzene-sulphonyl chloride (7.70 ml) was added dropwise over 10 minutes, after which the temperature was allowed to rise to a maximum of 0°C and maintained for 30 minutes. The mixed sulphonic acid anhydride began to crystallize out. The stirred mixture was again cooled to −10°C and a solution of hydroxylamine hydrochloride (4.17g) in anhydrous pyridine (15 ml) was added dropwise. The mixture was stirred for 2 hours at 0°C and gradually allowed to attain room temperature overnight. The resulting clear solution was evaporated to dryness in vacuo. The oily residue was dissolved in water and acidified to pH4 with hydrochloric acid. The resulting white precipitate was extracted into ether and the latter was washed with dilute hydrochloric acid, water, cold dilute sodium bicarbonate, water, dried over magnesium sulphate and evaporated to dryness in vacuo to give a cream solid. This solid was crystallized from ethyl acetate to yield 6,8-di-t-butyl-4-oxo-4H-1-benzopyran-2-carbohydroxamic acid as a white crystalline solid (7.2g) mp 184.5° – 185°C.

Analysis:
Found: C, 68.1; H, 7.4; N, 4.2%
C$_{18}$H$_{23}$NO$_4$ requires: C, 68.1; H, 7.3; N, 4.4%

Spectral Confirmation

The molecular weigt of 317 was confirmed by mass spectroscopy.

The infra red spectrum displayed peaks at 3250 and 3120 cm$^{-1}$ for the NH and OH stretching frequencies.

The nmr spectrum in deuterochloroform displayed the 3-proton of the benzopyran ring system as a sharp singlet at 2.88 τ.

b.

6,8-Di-t-Butyl-4-oxo-4H-1-benzopyran-2-carbohydroxamic acid sodium salt 6,8-Di-t-Butyl-4-oxo-4H-1-benzopyran-2-carbohydroxamic acid (3.7g), sodium bicarbonate (0.99g) and water (100 ml) were heated on a steam bath for 1 hour until complete dissolution had occurred and effervescence had ceased. The resulting yellow solution was freeze dried to give 6,8-di-t-butyl-4-oxo-4H-1-benzopyran-2-carbohydroxamic acid sodium salt as a yellow powder (4.0g).

Analysis:
Found: C, 57.9; H, 6.65; N, 3.75%
$C_{18}H_{22}NNaO_4 + 9\% H_2O$ requires: C, 57.9; H, 6.89; N, 3.75%

EXAMPLE 2

8-Allyl-5-(3-methylbutoxy)-4-oxo-4H-1-benzopyran-2-carbohydroxamic acid sodium salt a. 8-Allyl-5-(3-methylbutoxy)-4-oxo-4H-1-benzopyran-2-carbohydroxamic acid Benzene sulphonyl chloride (15.4 ml) was added dropwise over a period of 15 minutes to a stirred solution of 8-allyl-5-(3-methylbutoxy)-4-oxo-4H-1-benzopyran-2-carboxylic acid (38.0g) in anhydrous pyridine (500 ml) maintaining the temperature between 0° and −10°C. The solution was maintained at 0°C for a further 45 minutes and cooled again to −10°C. A solution of hydroxylamine hydrochloride (8.34g) in anhydrous pyridine (30 ml) was added to the above solution and the mixture was stirred for 3 hours. The pyridine was removed in vacuo and the residual oil was triturated with water, followed by acidification to pH 4.0 with concentrated hydrochloric acid. A yellow, fluffy precipitate and a sticky, brown solid were obtained. The former was decanted from the latter and was found to be starting material. The sticky, brown solid was collected and triturated with acetone and water to a brownish solid, which was collected, washed with water and dried in vacuo (27.7g), mp 168°–170°C (decomp). This material was treated with charcoal and twice crystallized from ethanol/water to give 8-allyl-5-(3-methylbutoxy)-4-oxo-4H-1-benzopyran-2-carbohydroxamic acid as a pale yellow, crystalline solid, which was collected and dried in vacuo (8.1 g) mp 179.5° – 180°C (decomp).
Analysis:
Found: C, 65.1; H, 6.5; N, 4.3%
$C_{18}H_{21}NO_5$ requires: C, 65.2; H, 6.4; N, 4.2%

Spectral Confirmation

Molecular weight = 331 by mass spectrometry.
The infra red spectrum revealed an N—H and O—H str. at 3200 cm$^{-1}$.
The nmr spectrum in hexadeuterodimethylsulphoxide displayed the 3-proton of the benzopyran ring system at 3.42τ and the NH and OH protons at 0.45τ and −1.45τ.

b. 8-allyl-5-(3-methylbutoxy)-4-oxo-4H-1-benzopyran-2-carbohydroxamic acid sodium salt 8-Allyl-5-(3-methylbutoxy)-4-oxo-4H-1-benzopyran-2-carbohydroxamic acid (2.6g) was dissolved in cold aqueous 1N sodium hydroxide solution (7.8 ml) followed by dilution with water (25 ml). The resulting yellow solution was filtered and the filtrate was freeze dried to give 8-allyl-5-(3-methylbutoxy)-4-oxo-4H-1-benzopyran-2-carbohydroxamic acid sodium salt dihydrate (2.8 g) as a yellow powder.
Analysis:
Found: C, 56.7; H, 6.2; N, 3.9%
$C_{18}H_{20}NO_5Na \cdot 2H_2O$ requires: C, 56.7; H, 6.1; N, 3.7%

Spectral Confirmation

The nmr spectrum in hexadeuterodimethylsulphoxide revealed the 3-proton of the benzopyran ring system at 3.57τ.

EXAMPLE 3

5-Hydroxy-8-n-propyl-4-oxo-4H-1-thiabenzopyran-2-carbohydroxamic acid a. Ethyl 5-hydroxy-8-n-propyl-4-oxo-4H-1-thiabenzopyran-2-carboxylate Sodium 5-(3-methylbutoxy)-8-n-propyl-4-oxo-4H-1-thiabenzopyran-2-carboxylate (15.0g) was refluxed in saturated, anhydrous ethanolic hydrogen chloride (200 ml) for 20 hours. The solution was evaporated to dryness and the solid state residue was triturated with water. The solid was filtered off, washed with water and dried. This material was treated with activated charcoal and crystallized from ethanol to give ethyl 5-hydroxy-8-n-propyl-4-oxo-4H-1-thiabenzopyran-2-carboxylate (8.1g) as yellow plates, mp 87°–89°C.
Analysis:
Found: C, 61.1; H, 5.6%
$C_{15}H_{16}O_4S$ requires: C, 61.6; H, 5.5%

Spectral Confirmation

The molecular weight was shown to be 292 by mass spectroscopy. The i.r. spectrum displays a very intense ester carbonyl stretching frequency at 1800 cm$^{-1}$ with the 4-oxo carbonyl stretch at 1620 cm$^{-1}$. The nmr spectrum in deuterochloroform reveals two sharp singlet resonances for the 3-proton of the benzopyran ring system and the phenolic proton at 2.43τ and −0.36τ respectively.

b. 5-Hydroxy-8-n-propyl-4-oxo-4H-1-thiabenzopyran-2-carbohydroxamic acid

Ethyl 5-hydroxy-8-n-propyl-4-oxo-4H-1-thiabenzopyran-2-carboxylate (7.0g; 0.019 mole) was dissolved in ethanol (80 ml) and a solution of freshly prepared hydroxylamine in ethanol (38.6 ml; contains 0.663 g; 0.019 mole of hydroxylamine) was added. An M/10 ethanolic solution of sodium hydroxide (19.3 ml; 0.019 mole) was added drop-wise to the stirred solution. After complete addition the yellow solution was stirred for a further 20 minutes at room temperature. The solution was evaporated to dryness in vacuo to give a yellow solid, which was taken up in water and filtered. The yellow filtrate was acidified to pH 3.0 and upon scratching a yellow solid began to crystallize out. This solid was collected by filtration, washed and dried in vacuo (2.2 g). After crystallization from ethyl acetate 5-hydroxy-8-n-propyl-4-oxo-4H-1-thiabenzopyran-2-carbohydroxamic acid was obtained as a yellow solid (1.9 g), mp 174.0° – 175.0°C (decomp).
Analysis:
Found: C, 55.95; H, 4.75; N, 5.0%
$C_{13}H_{13}NO_4S$ requires: C, 55.91; H, 4.69; N, 5.02%

Spectral Confirmation

The molecular weight was shown to be 279 by mass spectroscopy. The nmr spectrum in hexadeutero-dimethylsulphoxide revealed two sharp singlet resonances at 2.71 and −0.37τ for the 3-proton of the benzopyran ring system and the phenolic proton respectively.

c. Sodium 5-hydroxy-8-n-propyl-4-oxo-4H-1-thiabenzopyran-2-carbohydroxamate

5-Hydroxy-8-n-propyl-4-oxo-4H-1-thiabenzopyran-2-carbohydroxamic acid (1.8 g; 0.00645 mole) was suspended in water (20 ml) with stirring and 0.945N sodium hydroxide solution (6.84 ml; 0.00645 mole) was added dropwise. The resulting yellow solution was filtered and the filtrate was freeze dried to give sodium 5-hydroxy-8-n-propyl-4-oxo-4H-1-thiabenzopyran-2-carbohydroxamate (1.8 g) as a yellow-orange powder, after drying for a further 6 hours in vacuo.

Analysis:
Found: C, 49.0; H, 4.1; N, 4.15%
$C_{13}H_{12}NNaO_4S$ with 5.4% water requires: C, 49.0; H, 4.1; N, 4.4%

Spectral Confirmation

The nmr spectrum in hexadeuterodimethylsulphoxide revealed two sharp singlet resonances at 2.8 and −4.35τ for the 3-proton of the benzopyran ring system and the phenolic portion respectively.

EXAMPLE 4

6,8-Di-t-butyl-4-oxo-4H-1-benzopyran-2-(N-phenyl)carbohydroxamic acid a. 6,8-Di-t-butyl-4-oxo-4H-1-benzopyran-2-carbonyl chloride A mixture of 6,8-di-t-butyl-4-oxo-4H-1-benzopyran-2-carboxylic acid (30g; 0.1 mole), thionyl chloride (16 ml; 0.21 mole) and benzene (sodium dried, 150 ml) was refluxed for 1 hour. After 1 hour, 5 drops of dimethylformamide were added and refluxing was continued for another half hour. The solvent and excess thionyl chloride were removed in vacuo and the resulting oil solidified on cooling. This oil was crystallized from petrol (60°–80°C) to give 6,8-di-t-butyl-4-oxo-4H-1-benzopyran-2-carbonyl chloride as a white crystalline solid (26.2g), mp 97.5° – 98.5°C.

Analysis:
Found: Cl = 10.4%
$C_{18}H_{21}ClO_3$ required: Cl = 11.0%

Spectral Confirmation

The infra red spectrum shows a peak at 1770 cm$^{-1}$ characteristic of an acid chloride carbonyl stretching frequency.

b. 6,8-Di-t-butyl-4-oxo-4H-1-benzopyran-2-(N-phenyl)carbohydroxamic acid

N-Phenylhydroxylamine (3.7 g) and 6,8-di-t-butyl-4-oxo-4H-1-benzopyran-2-carbonyl chloride (10 g) were mutually dissolved in dry pyridine. The resulting solution was allowed to stand at room temperature for 2 days. The pyridine was removed in vacuo and the residue was triturated with water. The residue was extracted into chloroform and the organic layer was washed with dilute hydrochloric acid, brine, dried over anhydrous magnesium sulphate and filtered. The filtrate was evaporated to dryness to yieldd a fawn coloured solid. This solid was crystallized, with charcoal treatment, from methanol/water to give 6,8-di-t-butyl-4-oxo-4H-1-benzopyran-2-(N-phenyl)carbohydroxamic acid (2.5 g) mp 200°–201°C.

Analysis:
Found: C, 73.4; H, 7.2; N, 3.55%
$C_{24}H_{27}NO_4$ requires: C, 73.26; H, 6.92; N, 3.56%

Spectral Confirmation

The nmr spectrum in deuterochloroform revealed the resonance of the 3-proton of the benzopyran ring as a sharp singlet at 3.58τ.

EXAMPLE 5

6,8-Di-t-butyl-4-oxo-4H-1-benzopyran-2-(N-methyl)carbohydroxamic acid a. 6,8-Di-t-butyl-4-oxo-4H-1-benzopyran-2-(N-methyl)carbohydroxamic acid N-Methylhydroxylamine hydrochloride (4.6 g; 0.055 mole) and 6,8-di-t-butyl-4-oxo-4H-1-benzopyran-2-carbonyl chloride (16 g; 0.05 mole) were mutually dissolved in dry pyridine and allowed to stand at room temperature for 3 days. The pyridine was removed in vacuo and the residual oil was dissolved in chloroform. The latter was washed with 2N hydrochloric acid, brine, dried over anhydrous magnesium sulphate and filtered. The filtrate was evaporated to dryness to yield a solid. This solid was triturated with hot aqueous sodium bicarbonate solution, then filtered off. Crystallisation from chloroform/petrol (60°–80°) gave pure 6,8-di-t-butyl-4-oxo-4H-1-benzopyran-2-(N-methyl)carbohydroxamic acid (6.2 g), mp 176.5° – 177.5°C.

Analysis:
Found: C, 68.8; H, 7.9; N, 4.5%
$C_{19}H_{25}NO_4$ requires: C, 68.86; H, 7.60; N, 4.23%

Spectral Confirmation

The nmr spectrum in deuterochloroform revealed sharp singlet resonances from the N-methyl group at 5.51τ and the 3-proton of the benzopyran ring at 3.48τ.

b. Sodium 6,8-di-t-butyl-4-oxo-4H-1-benzopyran-2-(N-methyl) carbohydroxamate 6,8-Di-t-butyl-4-oxo-4H-1-benzopyran-2-(N-methyl) carbohydroxamic acid (5.0g; 0.0152 mole) was suspended in water (10 ml). Standard aqueous sodium hydroxide solution (0.945N, 16.0 ml; 0.0152 mole) was added resulting in a deep yellow solution. The latter was freeze dried to give sodium 6,8-di-t-butyl-4-oxo-4H-1-benzopyran-2-(N-methyl)carbohydroxamate dihydrated as a yellow powder.

Analysis:
Found: C, 59.3; H, 7.2; N, 3.5%
$C_{19}H_{24}NNaO_4.2H_2O$: C, 59.3; H, 7.2; N, 3.6%

EXAMPLE 6

8-Allyl-5-(3-methylbutoxy)-4-oxo-4H-1-benzopyran-2-(N-phenyl)carbohydroxamic acid a. 8-Allyl-5-(3-methylbutoxy)-4-oxo-4H-1-benzopyran-2-carbonyl chloride 8-Allyl-5-(3-methylbutoxy)-4-oxo-4H-1-benzopyran-2-carboxylic acid (24.8g; 0.08 mole) was suspended in a mixture of sodium dried benzene (200 ml) and thionyl chloride (12.8 g; 0.20 mole) and heated under reflux until complete dissolution occurred (approximately 3 hrs). The resulting solution was evaporated under reduced pressure to remove the solvent and the excess thionyl chloride. The yellow oil obtained crystallized from petrol (40°–60°) to give pure 8-allyl-5-(3-methylbutoxy)-4-oxo-4H-1-benzopyran-2-carbonyl chloride (17.5g). mp 63.5°–66°C.

Spectral Confirmation

The mass spectrum confirmed the molecular weight and also revealed isotopic abundance of chlorine (m/e 334 and 336 for molecular ions in the ratio 3:1). The infra red spectrum displayed a carbonyl stretching frequency at 1750 cm$^{-1}$ characteristic of an acid chloride.

b.
8-Allyl-5-(3-methylbutoxy)-4-oxo-4H-1-benzopyran-2-(N-phenyl)carbohydroxamic acid N-Phenylhydroxylamine (10.9g; 0.1 mole) and 8-allyl-5-(3-methylbutoxy)-4-oxo-4H-1-benzopyran-2-carbonyl chloride (33.4g; 0.1 mole) were mutually dissolved in dry pyridine (100 ml) and allowed to stand at room temperature for 4 hours. The pyridine was removed in vacuo and the residual oil was extracted into chloroform. The latter was washed with dilute hydrochloric acid, water, dried over magnesium sulphate and filtered. The filtrate was then evaporated to dryness and the resulting oil was crystallized from benzene/petrol (60°–80°) to give 8-allyl-5-(3-methylbutoxy)-4-oxo-4H-1-benzopyran-2-(N-phenyl)carbohydroxamic acid (6.8 g) as a white solid, mp 127°–129°C.
Analysis:
Found: C, 70.8; H, 6.2; N, 3.4%
$C_{24}H_{25}NO_5$ requires: C, 70.74; H, 6.18; N, 3.44%

Spectral Confirmation

The mass spectrum confirmed the molecular weight of 406. The nmr spectrum in deuterochloroform revealed the 3-proton of the benzopyran ring at 3.42τ and the N-phenyl group together with the 6- and 7- protons at 3τ.

EXAMPLE 7

8-Allyl-5-(3-methylbutoxy)-4-oxo-4H-1-benzopyran-2-(N-methyl) carbohydroxamic acid 8-Allyl-5-(3-methylbutoxy)-4-oxo-4H-1-benzopyran-2-carbonyl chloride (16.7 g; 0.05 mole), and N-methylhydroxylamine hydrochloride (4.60 g; 0.055 mole) were mutually dissolved in dry pyridine (55 ml) and stirred at room temperature overnight. The solution was evaporated to dryness and the residue was triturated with dilute hydrochloric acid. The resulting solid was filtered off, washed with water and dried. (17.8 g). This was crystallized from benzene to give a solid, which was heated with aqueous sodium bicarbonate solution and filtered off. The white solid collected was washed with water and dried in vacuo (11.0g). The latter was crystallized from benzene to give pure 8-allyl-5-(3-methylbutoxy)-4-oxo-4H-1-benzopyran-2-(N-methyl)carbohydroxamic acid (10.0g) mp 155°–156°C.
Analysis:
Found: C, 66.2; H, 6.8; N, 4.0%
$C_{19}H_{23}NO_5$ requires: C, 66.07; H, 6.71; N, 4.06%

Spectral Confirmation

The mass spectrum confirmed the molecular weight of 345. The nmr spectrum in deuterochloroform revealed the N-methyl resonance as a sharp singlet at 6.04τ and the 3-proton of the benzopyran ring as a singlet at 3.5τ.

Sodium 8-Allyl-5-(3-methylbutoxy)-4-oxo-4H-1-benzopyran-2-(N-methyl)carbohydroxamate -(N-methyl) carbohydroxamate 8-Allyl-5-(3-methylbutoxy)-4-oxo-4H-1-benzopyran-2-(N-methyl)carbohydroxamic acid (6.0 g; 0.0174 mole) was dissolved in water (80 ml) and 0.945 N aqueous sodium hydroxide solution (18.4 ml; 0.0174 mole). The resulting deep yellow solution was freeze dried to give sodium 8-allyl-5-(3-methylbutoxy)-4-oxo-4H-1-benzopyran-2-(N-methyl)carbohydroxamate sesquihydrate as a yellow powder (6.0g).
Analysis:
Found: C, 58.7; H, 6.3; N, 3.3
$C_{19}H_{22}NNaO_5 \cdot 1\frac{1}{2}H_2O$ requires: C, 58.7; H, 6.3; N, 3.6%

EXAMPLE 8

5-Methoxy-4,10-dioxo-4H,10H-benzo[1,2-b:3,4-b']-dipyran-2,8-dicarbohydroxamic acid, disodium salt dihydrate Diethyl 5-methoxy-4,10-dioxo-4H,10H-benzo[1,2-b:3,4-b']dipyran-2,8-dicarboxylate (7.8 g; 0.02 mole) was dissolved in chloroform (140 ml). A solution of hydroxylamine (2.64 g; 0.08 mole) in ethanol (160 ml) was added followed by the dropwise addition of a solution of sodium hydroxide (1.6g; 0.04 mole) in ethanol (40 ml). An immediate yellow precipitate was observed. After complete addition of the sodium hydroxide solution, the mixture was stirred at room temperature overnight. The yellow precipitate was collected by filtration, washed with chloroform and ethanol and dried in vacuo. The yellow powder was crystallized from acetone/water twice to give pure di-sodium 5-methoxy-4,10-dioxo-4H,10H-benzo[1,2-b:3,4-b']dipyran-2,8-dicarbohydroxamate dihydrate (1.0g).
Analysis:
Found: C, 40.9; H, 2.7; N, 6.0%
$C_{15}H_8N_2Na_2O_9 \cdot 2H_2O$ requires: C, 40.9; H, 2.7; N, 6.3%

EXAMPLE 9

6,8-Di-t-Butyl-4-oxo-4H-1-benzopyran-2-carbohydroxamic acid

A solution of hydroxylamine and sodium hydroxide in ethanol (40 ml) (prepared by mixing a solution of 6.95g of hydroxylamine hydrochloride in 100 ml of ethanol with a solution of 8.0g of sodium hydroxide in 100 ml of ethanol followed by filtration) was added dropwise to a stirred solution of ethyl 6,8-di-t-butyl-4-oxo-4H-1-benzopyran-2-carboxylate (6.6g; 0.02 moles) in ethanol (10 ml). An immediate yellow colour was obtained and the solution was stirred for ten minutes. The mixture was evaporated to dryness. The residue was taken up in water and the resulting yellow solution was acidified to pH 6.0 with acetic acid. An oil was obtained, which was extracted into ether. The etheral solution was washed with aqueous sodium bicarbonate solution, water, dried over magnesium sulphate, filtered and evaporated to dryness. The resulting residue was triturated with ether and petrol (60°–80°) to give a solid, which was collected and dried in vacuo (1.9 g) mp 174°–175°C. Crystallization of this solid from ethyl acetate/petrol (60°–80°) afforded pure 6,8-di-t-butyl-4-oxo-4H-1-benzopyran-2-carbohydroxamic acid, mp 184.5° – 185°C. This material was identical to that obtained by the method of Example 1a.

EXAMPLE 10 a. Di-sodium 5,5'-[(2-hydroxytrimethylene)dioxy]bis(4-oxo-4H-1-benzopyran-2-carbohydroxamate)dihydrate A solution of hydroxylamine (2.64g; 0.08 mole) in ethanol (160 ml) was added to a suspension of diethyl 5,5'-[(2-hydroxytrimethylene)dioxy]bis(4-oxo-4H-1-benzopyran-2-carboxylate (10.5g; 0.02 mole) in dimethylformamide (50 ml). To this mixture, stirred at room temperature, a solution of sodium hydroxide (1.6g; 0.04 mole) in ethanol (40 ml) was added dropwise over a period of 2 hours. The mixture became yellow on addition of alkali and it was stirred overnight at room temperature. The resulting yellow precipitate was filtered off, washed with ethanol and dried in vacuo (10.8g). This was recrystallized from water/acetone to afford pure disodium 5,5'[(2-hydroxytrimethylene)dioxy]bis(4-oxo-4H-1-benzopyran-2-carbohydroxamate)dihydrate (6.8g; 64% yield of theory).

Analysis:
Found: C, 47.4; H, 3.7; N, 4.7%
$C_{23}H_{16}N_2Na_2O_{11}\cdot 2H_2O$ requires: C, 47.7; H, 3.5; N, 4.8%

Spectral Confirmation

The nmr spectrum in hexadeuterodimethylsulphoxide revealed a two proton singlet resonance at 3.52τ for the 3 and 3'-protons of the benzopyran rings.

b. 5,5'-[(2-Hydroxytrimethylene)dioxy]bis(4-oxo-4H-1-benzopyran-2-carbohydroxamic acid) sesquihydrate Di-sodium 5,5'-[(2-hydroxytrimethylene)dioxy]bis(4-oxo-4H-1-benzopyran-2-carbohydroxamate)dihydrate (1.5g) was dissolved in water (60 ml) and the resulting solution was acidified to pH 4.0 by dropwise addition of glacial acetic acid. The resulting precipitate of 5,5'-[(2-hydroxytrimethylene)dioxy]bis(4-oxo-4H-1-benzopyran-2-carbohydroxamic acid) was collected, washed with water and dried in vacuo. (1.1g) mp 198°C (decomp).

Analysis:
Found: C, 52.9; H, 3.9; N, 5.1%
$C_{23}H_{18}N_2O_{11}\cdot 1\tfrac{1}{2}H_2O$ requires: C, 52.6; H, 3.9; N, 5.1%

Spectral Confirmation

The nmr spectrum in hexadeuterodimethylsulphoxide revealed a two proton singlet resonance at 3.44τ for the 3 and 3'-protons of the benzopyran rings.

EXAMPLE A

The procedure set out below may be used to assess the effectiveness of a compound in inhibiting the release of the pharmacological mediators of anaphylaxis.

In this test, the effectiveness of the compounds in inhibiting the passive cutaneous anaphylactic reaction in rats is assessed. It has been proved that this form of test gives reliable qualitative indications of the ability of the compounds under test to inhibit antibody-antigen reactions in man.

In this test method Charles River Frances/Fisons bred rats (male or female) having a body weight of from 100 to 150 gms are infected subcutaneously at weekly intervals with N, brasiliensis larvae in doses increasing from about 2000 larvae per animal to 12000 larvae per animal in order to establish the infection. After 8 weeks the rats are bled by heart puncture and 15–20 mls. of blood collected from each animal. The blood samples are then centrifuged at 3500 rpm. for 30 minutes in order too remove the blood cells from the blood plasma. The serum is collected and used to provide a serum containing N. brasiliensis antibody. A pilot sensitivity test is carried out to determine the least quantity of serum required to give a skin weal in control animals in the test described below of 2 cm diameter. It has been found that optimum sensitivity of rats in the body weight range 100–300 gms is obtained using a serum diluted with eight parts of physiological saline solution. This diluted solution is called antibody serum A.

The antigen to react with the antibody in serum A is prepared by removing N. brasiliensis worms from the gut of the infested rats, centrifuging the homogenate and collecting the supernatent liquor. This liquor is diluted with saline to give a protein content of 1 mg/ml and is known as solution B.

Charles River Frances/Fisons bred rats in the body weight range 100 to 130 gms are sensitized by intradermal injection of 0.1 mls of serum A into the right flank. Sensitivity is allowed to develop for 24 hours and the rats are then injected intravenously with 1 ml/100 gms body weight of a mixture of solution B (0.25 mls), Evans Blue dye solution (0.25 mls) and the solution of the compound under test (0.5 mls varying percentages of active matter). Insoluble compounds are administered as a separate intraperitoneal injection 5 minutes before intravenous administration of solution B and Evans Blue dye. For each percentage level of active matter in the solution under test five rats are injected. Five rats are used as controls in each test. The dosages of the compound under test are selected so as to give a range of inhibition values.

Thirty minutes after injection of solution B the rats are killed and the skins removed and reversed. The intensity of the anaphylactic reaction is assessed by comparing the size of the characteristic blue weal produced by spread of the Evans Blue dye from the sensitization site, with the size of the weal in the control animals. The size of the weal is rated as 0 (no weal detected, i.e. 100% inhibition) to 4 (no difference in size of weal, i.e. no inhibition) and the percentage inhibition for each dose level calculated as:

Percent inhibition=

$$\frac{(\text{Control group score} - \text{treated group score}) \times 100}{\text{Control group score}}$$

The percentage inhibitions for the various dose levels are plotted graphically for each compound. From these graphs the dosage required to achieve a 50% inhibition of the anaphylactic reaction ($ID_{50}$) may be determined.

The compounds are also evaluated in the above manner using intestinal and gastric administration of the compound.

We claim:

1. A compound of the formula

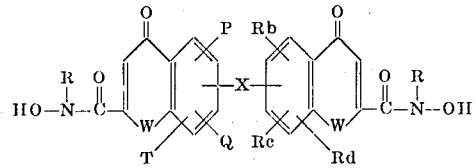

wherein W is oxygen or sulphur,
R is hydrogen, alkyl of 1 to 6 carbon atoms or phenyl, X is a carbon-carbon bond, —CH$_2$—, —CHOH—, —C(R$^4$)$_2$—, —CO—, —CH(COOH)—, —C(=CCl$_2$)—NH—, —S—, —SO$_2$—, or —O—, a saturated or unsaturated, straight or branched C(2 to 10) polymethylene chain optionally substituted by —OH, C(1 to 6) alkoxy, halogen, carboxyl oxygen, and optionally interrupted by an oxygen or nitrogen atom, and R$^4$ is an alkyl C (1 to 6) group, or X is an —OX'O— group in which X' is a saturated or unsaturated, straight or branched C (2 to 10) polymethylene chain optionally substituted by —OH, C(1 to 6) alkoxy, halogen or carbonyl oxygen and optionally interrupted by an oxygen or nitrogen atom, P, Q, T, Rb, Rc, and Rd, which may be the same or different, each represent hydrogen, C (1 to 10) alkyl, halogen, hydroxy, C(2 to 10) alkenyl, phenyl, C(1 to 10) alkoxy, C(2 to 10) alkenyloxy, phenyl C (1 to 4) alkoxy, hydroxy C (1 to 10) alkyl, hydroxy C (1 to 10) alkoxy, C(1 to 10) alkoxy-C(1 to 10) alkyl and C (1 to 10) alkoxy-C (1 to 10) alkoxy, and pharmaceutically acceptable salts thereof.

2. A compound according to claim 1, wherein each of P, Q, T, Rb, Rc and Rd contains up to 6 carbon atoms.

3. A compound according to claim 1, wherein each W is oxygen.

4. A compound according to claim 1, wherein P, Q, T, Rb, Rc and Rd are all hydrogen.

5. A compound according to claim 1, wherein X is an —OX'O— group as defined in claim 1.

6. A compound according to claim 1 of formula

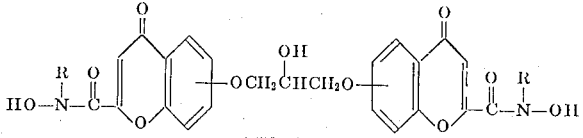

in which R is as defined in claim 1.

7. A compound according to claim 1 which is 5,5'-[2-hydroxytrimethylene)dioxy]bis(4-oxo-4H-1-benzopyran-2-carbohydroxamic acid).

8. A compound according to claim 1 in the form of a pharmaceutically acceptable salt thereof.

* * * * *